(12) United States Patent
Ahn et al.

(10) Patent No.: US 9,742,540 B2
(45) Date of Patent: *Aug. 22, 2017

(54) METHOD AND APPARATUS FOR TRANSMITTING UPLINK SIGNAL

(71) Applicant: LG ELECTRONICS INC., Seoul (KR)

(72) Inventors: Joon Kui Ahn, Seoul (KR); Suck Chel Yang, Seoul (KR); Yun Jung Yi, Seoul (KR); Dong Youn Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,028

(22) Filed: Jul. 19, 2016

(65) Prior Publication Data

US 2017/0019228 A1    Jan. 19, 2017

Related U.S. Application Data

(63) Continuation of application No. 14/067,691, filed on Oct. 30, 2013, now Pat. No. 9,413,503.

(Continued)

(30) Foreign Application Priority Data

Oct. 28, 2013 (KR) .......................... 10-2013-0128367

(51) Int. Cl.
*H04L 5/00* (2006.01)
*H04L 27/26* (2006.01)
*H04W 72/04* (2009.01)

(52) U.S. Cl.
CPC ............ *H04L 5/0048* (2013.01); *H04L 5/001* (2013.01); *H04L 5/0044* (2013.01);
(Continued)

(58) Field of Classification Search
CPC ...... H04L 5/001; H04L 5/0044; H04L 5/0048; H04L 5/0053; H04L 5/0094
See application file for complete search history.

(56) References Cited

U.S. PATENT DOCUMENTS 8,391,129 B2    3/2013  Dinan
2010/0103902 A1*  4/2010  Kim ..................... H04L 5/0048
                                                                370/330

(Continued)

FOREIGN PATENT DOCUMENTS

CN    102356675 A    2/2012
CN    102572967 A    7/2012

(Continued)

OTHER PUBLICATIONS

Fujitsu, "Status of offline discussion on PUCCH/PUSCH/SRS", 3GPP TSG RAN WG1 Meeting #63, R1-106536, Jacksonville, FL., Nov. 15-19, 2010, 6 pages.

(Continued)

*Primary Examiner* — Khaled Kassim
(74) *Attorney, Agent, or Firm* — Birch, Stewart, Kolasch & Birch, LLP

(57) ABSTRACT

A method and device for transmitting an uplink signal in a wireless communication system A user equipment (UE) sets up a sounding reference signal (SRS) configuration for a first serving cell, the SRS configuration including information for an SRS transmission, and determines an SRS subframe in which an SRS and a physical uplink shared channel (PUSCH) for the first serving cell are simultaneously triggered among a plurality of subframes according to the SRS configuration. The SRS subframe includes a plurality of orthogonal frequency division multiplexing (OFDM) symbols. If an SRS transmission on the SRS subframe for the first serving cell is overlapped with an uplink transmission for a second serving cell, determining, by the UE, whether (Continued)

the SRS is actually to be transmitted in the SRS subframe based on a total uplink transmission power.

11 Claims, 12 Drawing Sheets

Related U.S. Application Data

(60) Provisional application No. 61/726,007, filed on Nov. 13, 2012, provisional application No. 61/720,999, filed on Oct. 31, 2012.

(52) U.S. Cl.
CPC .......... *H04L 5/0051* (2013.01); *H04L 5/0094* (2013.01); *H04L 27/2601* (2013.01); *H04W 72/0446* (2013.01); *H04L 5/0053* (2013.01)

(56) References Cited

U.S. PATENT DOCUMENTS

| | | | |
|---|---|---|---|
| 2010/0246561 A1* | 9/2010 | Shin | H04W 52/32 370/345 |
| 2011/0261763 A1 | 10/2011 | Chun et al. | |
| 2011/0268028 A1* | 11/2011 | Stern-Berkowitz | H04L 5/0048 370/328 |
| 2012/0034927 A1* | 2/2012 | Papasakellariou | H04L 1/1861 455/450 |
| 2012/0076037 A1 | 3/2012 | Noh et al. | |
| 2012/0106495 A1 | 5/2012 | Yang et al. | |
| 2012/0243505 A1* | 9/2012 | Lin | H04L 5/0051 370/331 |
| 2012/0257570 A1* | 10/2012 | Jang | H04L 5/001 370/328 |
| 2012/0275393 A1* | 11/2012 | Sorrentino | H04L 5/0094 370/329 |
| 2012/0281653 A1 | 11/2012 | Park et al. | |
| 2012/0281654 A1* | 11/2012 | Aiba | H04L 5/0007 370/329 |
| 2012/0307821 A1 | 12/2012 | Kwon et al. | |
| 2012/0314671 A1* | 12/2012 | Noh | H04B 7/155 370/329 |
| 2013/0010723 A1* | 1/2013 | Ouchi | H04L 5/0048 370/329 |
| 2013/0100938 A1* | 4/2013 | Kwon | H04W 56/0045 370/336 |
| 2013/0114505 A1* | 5/2013 | Haim | H04W 52/146 370/328 |
| 2013/0259008 A1* | 10/2013 | Dinan | H04W 56/001 370/336 |
| 2013/0260735 A1* | 10/2013 | Dinan | H04W 72/0406 455/418 |
| 2014/0023030 A1 | 1/2014 | Jeong et al. | |
| 2014/0050205 A1 | 2/2014 | Ahn et al. | |
| 2014/0056271 A1 | 2/2014 | Ahn et al. | |
| 2014/0293947 A1 | 10/2014 | Nishikawa et al. | |
| 2015/0036601 A1 | 2/2015 | Kim et al. | |
| 2016/0127100 A1 | 5/2016 | Xu et al. | |

FOREIGN PATENT DOCUMENTS

| | | |
|---|---|---|
| JP | 2013-102398 A | 5/2013 |
| JP | 5706047 B2 | 4/2015 |
| KR | 10-2010-0123655 A | 11/2010 |
| KR | 10-2011-0011568 A | 2/2011 |
| KR | 10-2011-0081092 A | 7/2011 |
| KR | 10-2011-0093632 A | 8/2011 |
| KR | 10-2012-0114176 A | 10/2012 |
| KR | 10-2013-0035221 A | 4/2013 |
| KR | 10-2013-0035222 A | 4/2013 |
| KR | 10-2013-0077387 A | 7/2013 |
| KR | 10-1306377 | 9/2013 |
| KR | 10-1306404 A | 9/2013 |
| RU | 2464741 C1 | 10/2012 |
| WO | WO 2007/130324 A2 | 11/2007 |
| WO | WO 2011/041623 A1 | 4/2011 |
| WO | WO 2011/099829 A2 | 8/2011 |
| WO | WO 2012/088876 A1 | 7/2012 |
| WO | WO 2012/092714 A1 | 7/2012 |

OTHER PUBLICATIONS

HTC, "Parallel transmissions of SRS+SRS in different TAGs", 3GPP TSG RAN WG1 Meeting #70bis, R1-124550, San Diego, USA, Oct. 8-12, 2012, pp. 1-3.

Huawei et al., "Discussion on UL Control Signalling Transmission with Multiple TAs," 3GPP TSG RAN WG1 Meeting #68, R1-120123, Dresden, Germany, Feb. 6-10, 2012 (EPO Server date Jan. 31, 2012), 3 pages, XP-50562700A.

LG Electronics et al., "Joint proposal on PUSCH rate matching with SRS", 3GPP TSG RAN WG1 #71, R1-125380, New Orleans, USA, Nov. 12-16, 2012, 2 pages.

LG Electronics, "SRS transmissions in multiple TA", 3GPP TSG RAN WG1 #68bis, R1-121425, Jeju, Korea, Mar. 26-30, 2012, 4 pages.

LG Electronics, "Remaining RAN1 Issues on Multiple TA," 3GPP TSG RAN WG1 #71, R1-124972, New Orleans, USA, Nov. 12-16, 2012, 3 pages.

Motorola Mobility, "SRS Enhancements for CoMP", 3GPP TSG RAN1#70, R1-123814, Qingdao, P.R. China, Aug. 13-17, 2012, 7 pages.

NTT DOCOMO, "UL Simultaneous Transmissions for multiple TA", 3GPP TSG RAN WG1 Meeting #68, R1-120400, Dresden, Germany, Feb. 6-10, 2012, pp. 1-4.

NTT DOCOMO, "Issues on UL Simultaneous Transmission for Multiple TA," 3GPP TSG RAN WG1 Meeting #67, R1-114070, San Francisco, USA, Nov. 14-18, 2011 (EPO Server date Nov. 10, 2011), pp. 1-3, XP-50562404A.

NTT DOCOMO, "UL Transmissions in Case of Power Limitation for Multiple TA," 3GPP TSG RAN WG1 Meeting #69, R1-122376, Prague, Czech Republic, May 21-25, 2012 (EPO Server date May 13, 2012), pp. 1-4, XP-50601034A.

* cited by examiner (A)

(B)

METHOD AND APPARATUS FOR TRANSMITTING UPLINK SIGNAL

CROSS REFERENCE TO RELATED APPLICATIONS

This application is a Continuation of U.S. application Ser. No. 14/067,691 filed Oct. 30, 2013(now U.S. Pat. No. 9,413,503 issued on Aug. 9,2016), which claims the benefit of priority of U.S. Provisional Application Nos. 61/720,999 filed on Oct. 31, 2012, and 61/726,007 filed on Nov. 13, 2012, and Korean Patent Application No. 10-2013-0128367 filed on Oct. 28, 2013, all of which are incorporated by reference in their entirety herein.

BACKGROUND OF THE INVENTION

The present invention relates to wireless communications, and more particularly, to a method and apparatus for transmitting an uplink signal in a wireless communication system.

$3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V8.7.0 (2009-05) "Evolved Universal Terrestrial Radio Access (E-UTRA); Physical Channels and Modulation (Release 8)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

In addition to the PUSCH and the PUCCH, a user equipment transmits various uplink signals. For example, the uplink signal may include a sounding reference signal (SRS) and a random access preamble. However, due to capability of the user equipment or a maximum transmit power limitation, there is a limitation in uplink signals that can be transmitted simultaneously. Therefore, even if a plurality of uplink signals are triggered in a specific duration, an uplink signal which satisfies a specific condition is transmitted in general.

However, since a carrier aggregation(CA) is introduced and a user equipment can receive a service provided from a plurality of serving cells, a transmission error may occur in an uplink signal between a base station and the user equipment.

SUMMARY OF THE INVENTION

The present invention provides a method of transmitting an uplink signal by a wireless device in which a plurality of timing advance (TA) groups are configured, and the wireless device using the method.

In an aspect, a method for transmitting an uplink signal in a wireless communication system is provided. The method includes receiving, by a user equipment, a message to configure a plurality of timing advance groups from a base station, receiving, by the user equipment, a sounding reference signal (SRS) configuration for a first serving cell from the base station, the SRS configuration including information for periodic SRS transmission, determining, by the user equipment, a SRS subframe among a plurality of subframes according to the SRS configuration, the SRS subframe including a plurality of orthogonal frequency division multiplexing (OFDM) symbols, and if a SRS transmission on the SRS subframe for the first serving cell is overlapped with an uplink transmission for a second serving cell, transmitting, by the user equipment, a physical uplink shared channel (PUSCH) on the SRS subframe for the first serving cell to the base station. The PUSCH is transmitted on remaining OFDM symbols in the SRS subframe except a single OFDM symbol reserved for the SRS transmission regardless of whether a SRS is transmitted on the single OFDM symbol or not.

If a total uplink transmission power exceeds the user equipment's maximum transmit power on the overlapped portion, the SRS transmission may be dropped on the SRS subframe for the first serving cell.

If a total uplink transmission power does not exceed the user equipment's maximum transmit power on the overlapped portion, the SRS may be transmitted on the single OFDM symbol in the SRS subframe.

In another aspect, a device configured for transmitting an uplink signal in a wireless communication system is provided. The device includes a radio frequency (RF) unit configured to receive and transmit radio signals, and a processor operatively coupled with the RF unit and configured to receive, via the RF unit, a message to configure a plurality of timing advance groups from a base station, receive, via the RF unit, a sounding reference signal (SRS) configuration for a first serving cell from the base station, the SRS configuration including information for periodic SRS transmission, determine a SRS subframe among a plurality of subframes according to the SRS configuration, the SRS subframe including a plurality of orthogonal frequency division multiplexing (OFDM) symbols, and if a SRS transmission on the SRS subframe for the first serving cell is overlapped with an uplink transmission for a second serving cell, transmit, via the RF unit, a physical uplink shared channel (PUSCH) on the SRS subframe for the first serving cell to the base station. The PUSCH is transmitted on remaining OFDM symbols in the SRS subframe except a single OFDM symbol reserved for the SRS transmission regardless of whether a SRS is transmitted on the single OFDM symbol or not.

A decoding error rate of an uplink channel between a base station and a wireless device can be decreased.

DETAILED DESCRIPTION OF THE INVENTION

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

Figure 1:
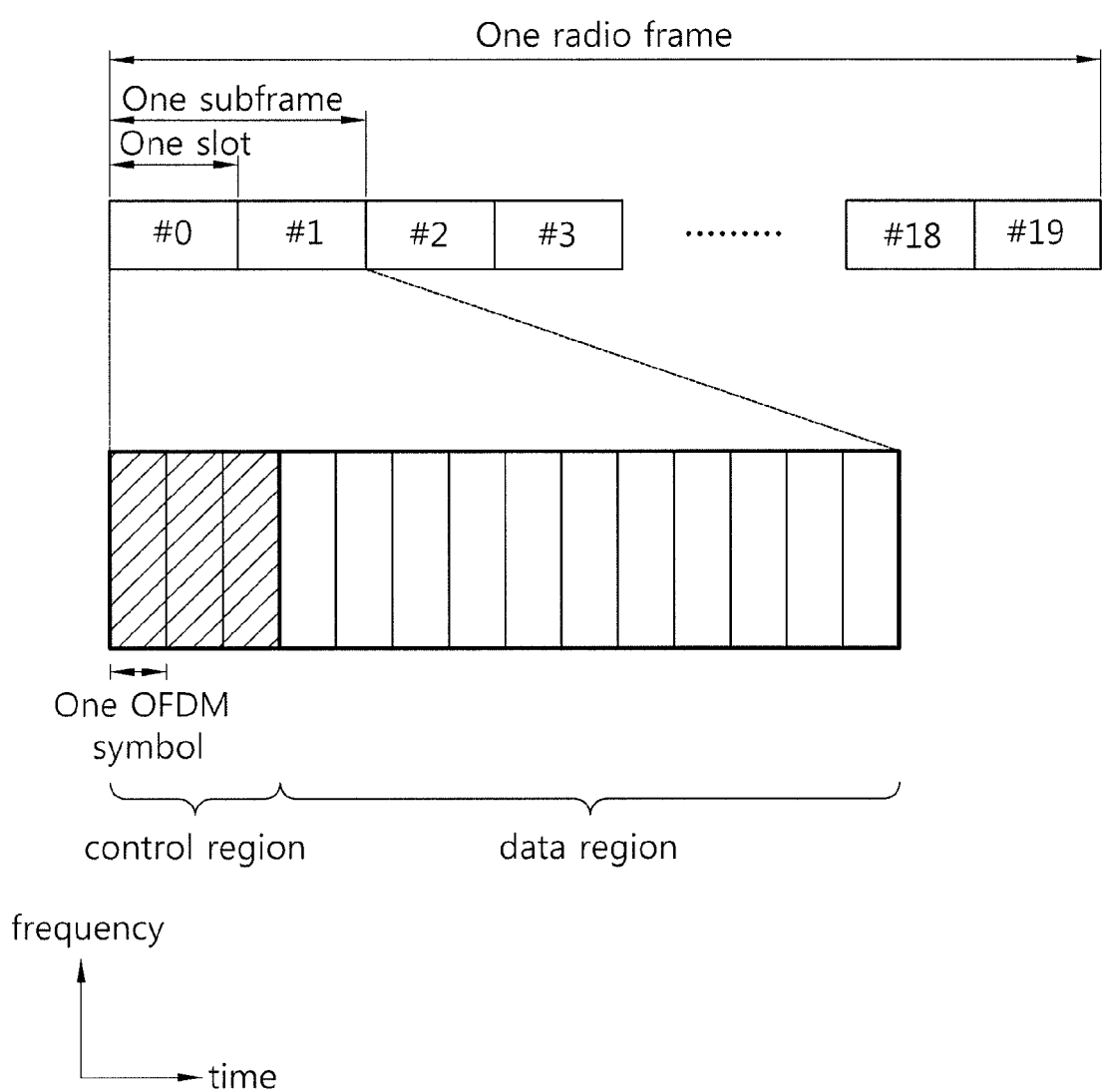
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first three OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

Figure 2:
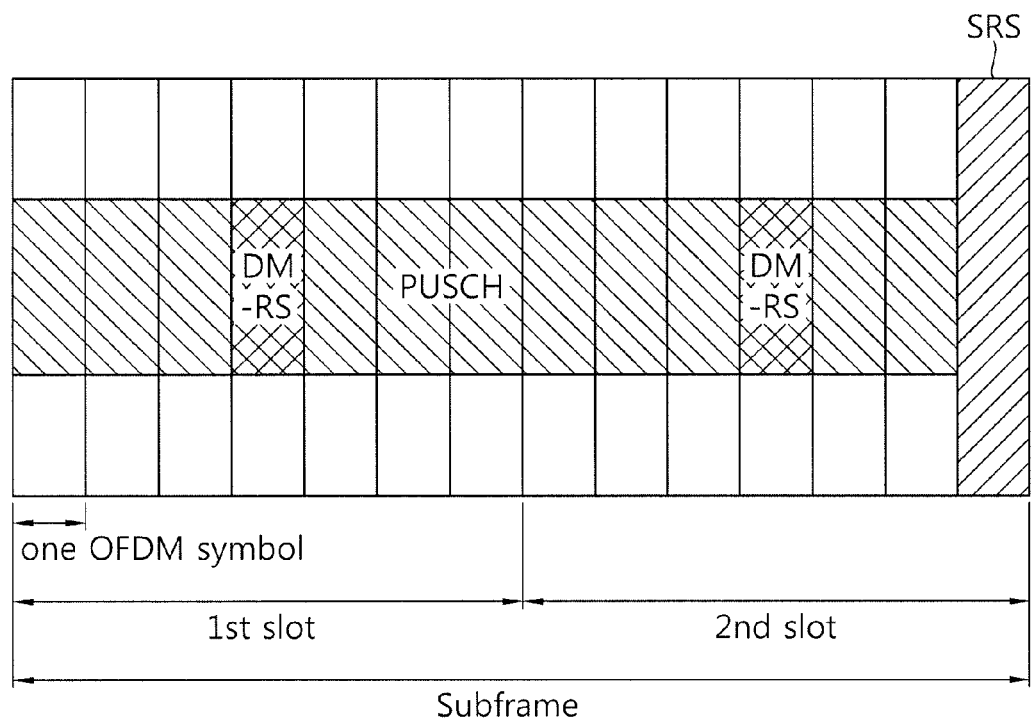
FIG. 2 shows an example of an uplink (UL) subframe.

FIG. 2 shows an example of a UL subframe. The number of OFDM symbols included in the subframe and an arrangement of each UL channel are for exemplary purposes only.

According to 3GPP TS 36.211 V8.7.0, the UL channel includes a PUSCH, a PUCCH, a sounding reference signal (SRS), and a physical random access channel (PRACH).

The PUSCH may be allocated by a UL grant on a PDCCH, and is used to carry user traffic. When the PUSCH is transmitted, a demodulation reference signal (DM RS) for PUSCH demodulation is transmitted in a $4^{th}$ OFDM symbol of each slot. The PUCCH is used to carry a control signal such as CQI and ACK/NACK for HARQ.

The SRS is a signal used by a BS to estimate a state of the UL channel.

The SRS transmission can be classified into periodic SRS transmission and aperiodic SRS transmission. The periodic SRS transmission is when transmission is performed in a subframe triggered by a periodic SRS configuration. The periodic SRS configuration includes an SRS periodicity and an SRS subframe offset. If the periodic SRS configuration is given, a UE can periodically transmit an SRS in a subframe satisfying the periodic SRS configuration.

In the aperiodic SRS transmission, the SRS is transmitted upon detection of an SRS request of a BS. For the aperiodic SRS transmission, the SRS configuration is given in advance. The SRS configuration also includes an SRS periodicity $T_{SRS}$ and an SRS subframe offset $T_{Offset}$.

The SRS request for triggering of the aperiodic SRS transmission may be included in a DL grant or a UL grant on a PDCCH. For example, if the SRS request is 1 bit, '0' may indicate a negative SRS request, and '1' may indicate a positive SRS request. If the SRS request is 2 bits, '00' may indicate a negative SRS request, and the others may indicate a positive SRS request. In this case, one of a plurality of SRS configurations for SRS transmission can be selected.

If the DL grant or the UL grant does not include a cell index (CI), an SRS can be transmitted in a serving cell of a PDCCH in which an SRS request is detected. If the DL grant or the UL grant includes the CI, the SRS can be transmitted in a serving cell indicated by the CI.

Assume that a positive SRS request is detected in a subframe n of a serving cell. Upon detection of the positive SRS request, an SRS is transmitted in a first subframe satisfying a condition of n+k where k≥4 as well as $T_{SRS}>2$ in time division duplex (TDD) and $(10*n_f+k_{SRS}-T_{offset})$ mod $T_{SRS}=0$ in frequency division duplex (FDD). In FDD, a subframe index $k_{SRS}$ is $\{0, 1, \ldots, 9\}$ in a frame $n_f$. In TDD, $k_{SRS}$ is defined by a predetermined table. In TDD of $T_{SRS}=2$, the SRS is transmitted in a first subframe satisfying a condition of $(k_{SRS}-T_{offset})$mod 5=0.

Hereinafter, a subframe in which the SRS is transmitted is called an SRS subframe or a triggered subframe. In periodic SRS transmission and aperiodic SRS transmission, the SRS can be determined in an SRS subframe determined UE-specifically.

An OFDM symbol in which the SRS is transmitted may have a fixed position in the SRS subframe. For example, the SRS may be transmitted in a last OFDM symbol of the SRS subframe. The OFDM symbol in which the SRS is transmitted is called a sounding reference symbol.

Now, a UL transmit power in 3GPP LTE will be described with reference to the section 5 of 3GPP TS 36.213 V8.7.0 (2009-05).

A transmit power $P_{PUSCH}(i)$ for PUSCH transmission at a subframe i is defined as follows.

$$P_{PUSCH}(i)=\min\{P_{CMAX}, 10 \log_{10}(M_{PUSCH}(i))+ P_{O\_PUSCH}(j)+\alpha(j)PL+\Delta_{TF}(i)+f(i)\}$$ [Equation 1]

Herein, $P_{CMAX}$ denotes a configured UE transmit power, and $M_{PUSCH}(i)$ denotes a bandwidth of a PUSCH resource assignment based on an RB unit. $P_{O\_PUSCH}(j)$ denotes a parameter composed of a sum of a cell-specific element $P_{O\_NOMINAL\_PUSCH}(j)$ and a UE-specific element $P_{O\_UE\_PUSCH}(j)$ which are provided by a higher layer when j=0 and 1. $\alpha(j)$ denotes a parameter provided to the higher layer. PL denotes a downlink path-loss estimation calculated by the UE. $\Delta_{TF}(i)$ denotes a UE-specific parameter. f(i) denotes a UE-specific value derived from TPC. min{A,B} denotes a function for returning a smaller value between A and B.

A transmit power $P_{PUCCH}(i)$ for PUCCH transmission at a subframe i is defined as follows.

$$P_{PUCCH}(i)=\min\{P_{CMAX}, P_{O\_PUCCH}+PL+h(n_{CQI}, n_{HARQ})+\Delta_{F\_PUCCH}(F)+g(i)\}$$ [Equation 2]

Herein, $P_{CMAX}$ and PL are the same as those of Equation 1, and $P_{O\_PUCCH}(j)$ denotes a parameter composed of a sum of a cell-specific element $P_{O\_NOMINAL\_PUCCH}(j)$ and a UE-specific element $P_{O\_UE\_PUCCH}(j)$ which are provided from a higher layer. $h(n_{CQI}, n_{HARQ})$ denotes a value dependent on a PUCCH format. $\Delta_{F\_PUCCH}(F)$ denotes a parameter provided by the higher layer. g(i) denotes a UE-specific value derived from TPC.

A transmit power $P_{SRS}(i)$ for SRS transmission at a subframe i is defined as follows.

$$P_{SRS}(i)=\min\{P_{CMAX}, P_{SRS\_OFFSET}+10 \log_{10}(M_{SRS})+ P_{O\_PUSCH}(j)+\alpha(j)PL+f(i)\}$$ [Equation 3]

Herein, $P_{CMAX}$, $P_{O\_PUSCH}(j)$, $\alpha(j)$, PL, and f(i) are the same as those of Equation 2, $P_{SRS\_OFFSET}$ denotes a UE-specific parameter provided by a higher layer, and $M_{SRS}$ denotes a bandwidth for SRS transmission.

Now, a multiple carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or also referred to as bandwidth aggregation or carrier aggregation) supports multiple CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through multiple CCs, it can be said that the UE receives a service from multiple serving cells.

Figure 3:
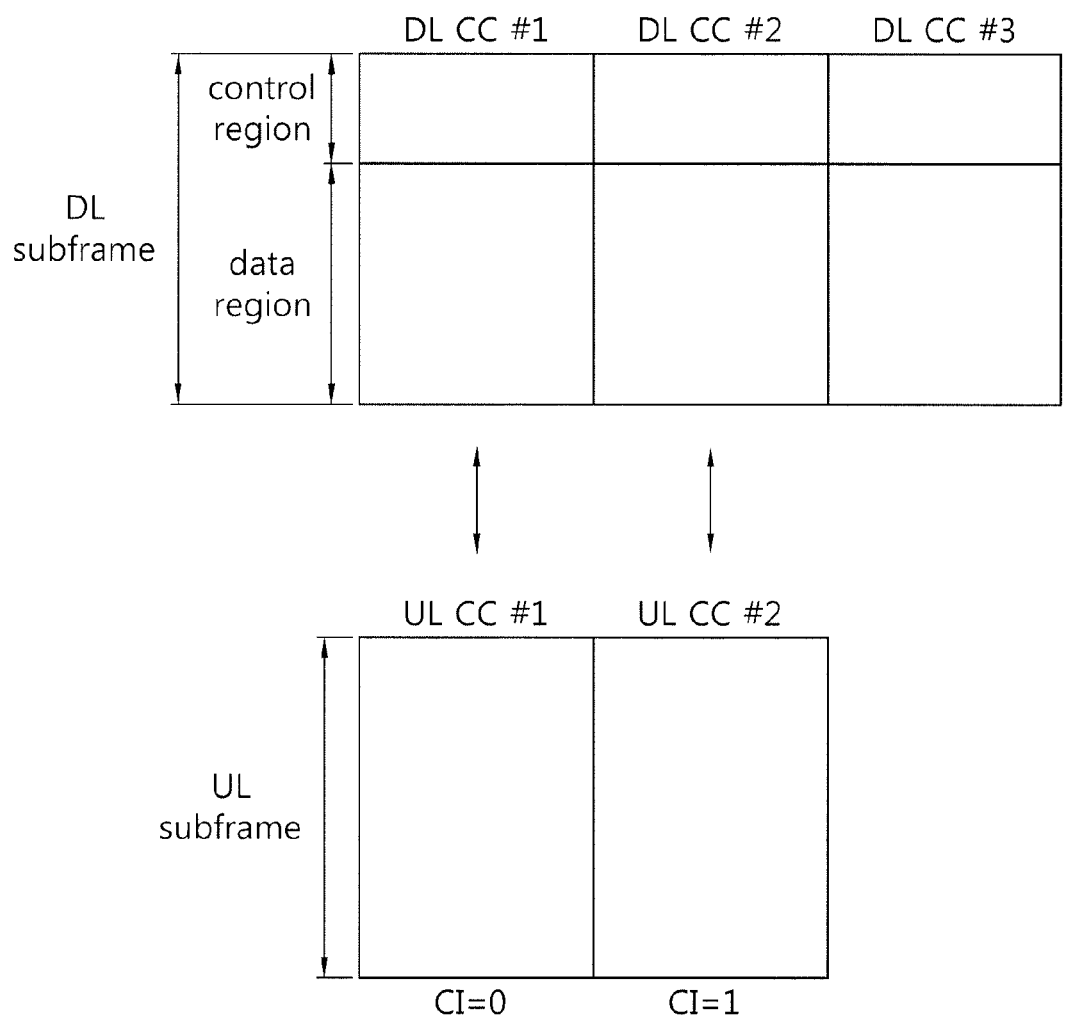
FIG. 3 shows an example of multiple carriers.

FIG. 3 shows an example of multiple carriers.

Although 3 DL CCs and 2 UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since 2 DL CC-UL CC pairs and one DL CC are defined, it can be said that a UE receives a service from 3 serving cells.

The UE can monitor the PDCCH in multiple DL CCs, and can receive a DL transport block simultaneously via the multiple DL CCs. The UE can transmit multiple UL transport blocks simultaneously via multiple UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell (or PCell) and a secondary cell (or SCell). The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

The UE can monitor a PDCCH through multiple serving cells. However, even if there are N serving cells, the BS can be configured to monitor the PDCCH for M (M≤N) serving cells. In addition, the BS can be configured to preferentially monitor the PDCCH for L (L≤M≤N) serving cells.

In the conventional 3GPP LTE, even if the UE supports multiple CCs, one timing alignment (TA) value is commonly applied to the multiple CCs. However, a propagation property may change since the multiple CCs are spaced apart from each other to a great extent in a frequency domain. For example, a remote radio header (RRH) and devices may exist in an area of the BS to extend a coverage or to remove a coverage hole.

Figure 4:
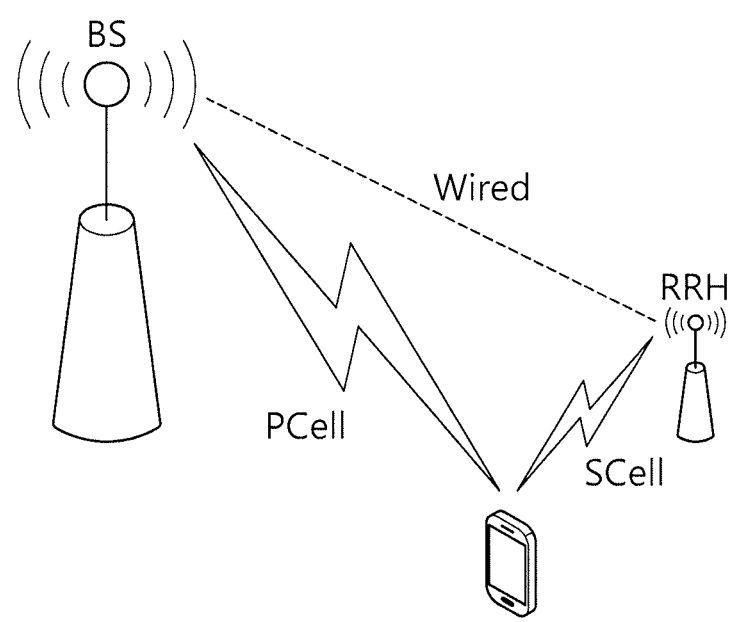
FIG. 4 shows a UL propagation difference among multiple cells.

FIG. 4 shows a UL propagation difference among multiple cells.

A UE is served by a primary cell (PCell) and a secondary cell (SCell). The primary cell provides a service by using a BS, and the secondary cell provides a service by using an RRH coupled to the BS. A propagation delay property of the primary cell may be different from a propagation delay property of the secondary cell due to a distance between the BS and the RRH, a processing time of the RRH, etc.

In this case, if the same TA value is applied to the primary cell and the secondary cell, it may have a significant effect on a time alignment of a UL signal.

Figure 5:
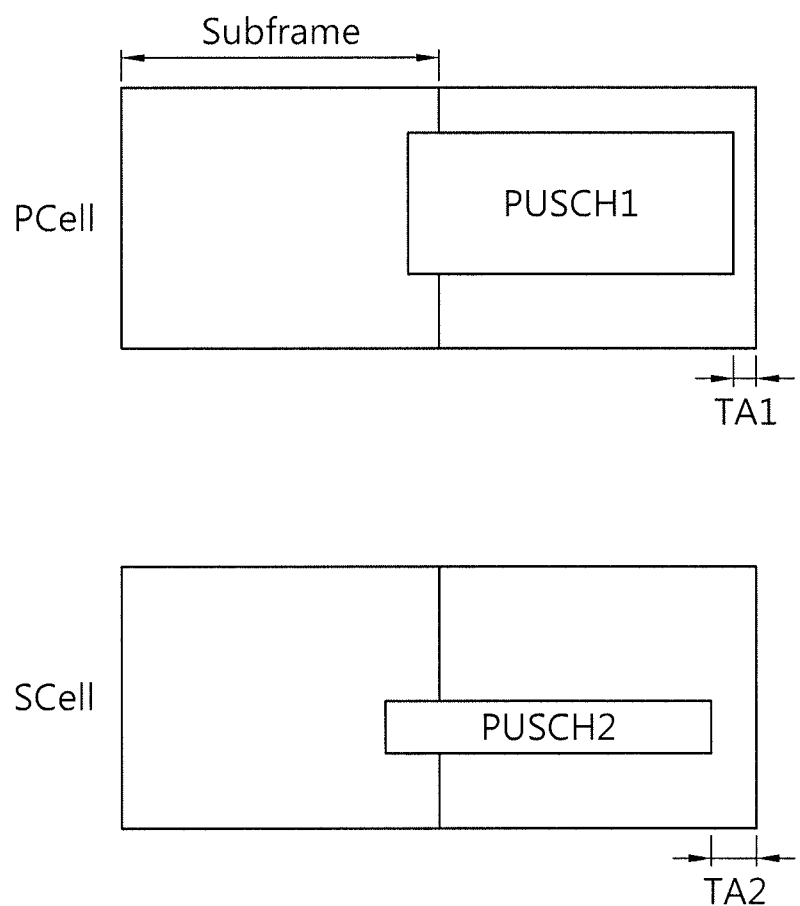
FIG. 5 shows an example in which a timing alignment (TA) varies among multiple cells.

FIG. 5 shows an example in which a TA varies among multiple cells.

An actual TA of a primary cell is 'TA 1', and an actual TA of a secondary cell is 'TA 2'. Therefore, it is necessary to apply an independent TA for each serving cell.

To apply the independent TA, a TA group is defined. The TA group includes one or more cells to which the same TA is applied. The TA is allocated for each TA group, and a time alignment timer operates for each TA group.

Hereinafter, two serving cells, i.e., a $1^{st}$ serving cell and a $2^{nd}$ serving cell, are considered, and it is assumed that the $1^{st}$ serving cell belongs to a $1^{st}$ TA group, and the $2^{nd}$ serving cell belongs to a $2^{nd}$ TA group. The number of serving cells and TA groups are for exemplary purposes only. The $1^{st}$ serving cell may be the primary cell or the secondary cell, and the $2^{nd}$ serving cell may be the primary cell or the secondary cell.

The TA group may include at least one serving cell. Information regarding the configuration of the TA group may be reported by a BS to a UE.

Hereinafter, a method of transmitting a plurality of UL channels is proposed when a plurality of TA groups are configured or two or more serving cells are configured.

In the conventional 3GPP LTE, an SRS and a PUSCH cannot be transmitted in one OFDM symbol. This is to decrease a UL complexity and to decrease a size of peak-to-average power ratio (PAPR) for UL transmission.

Figure 6:
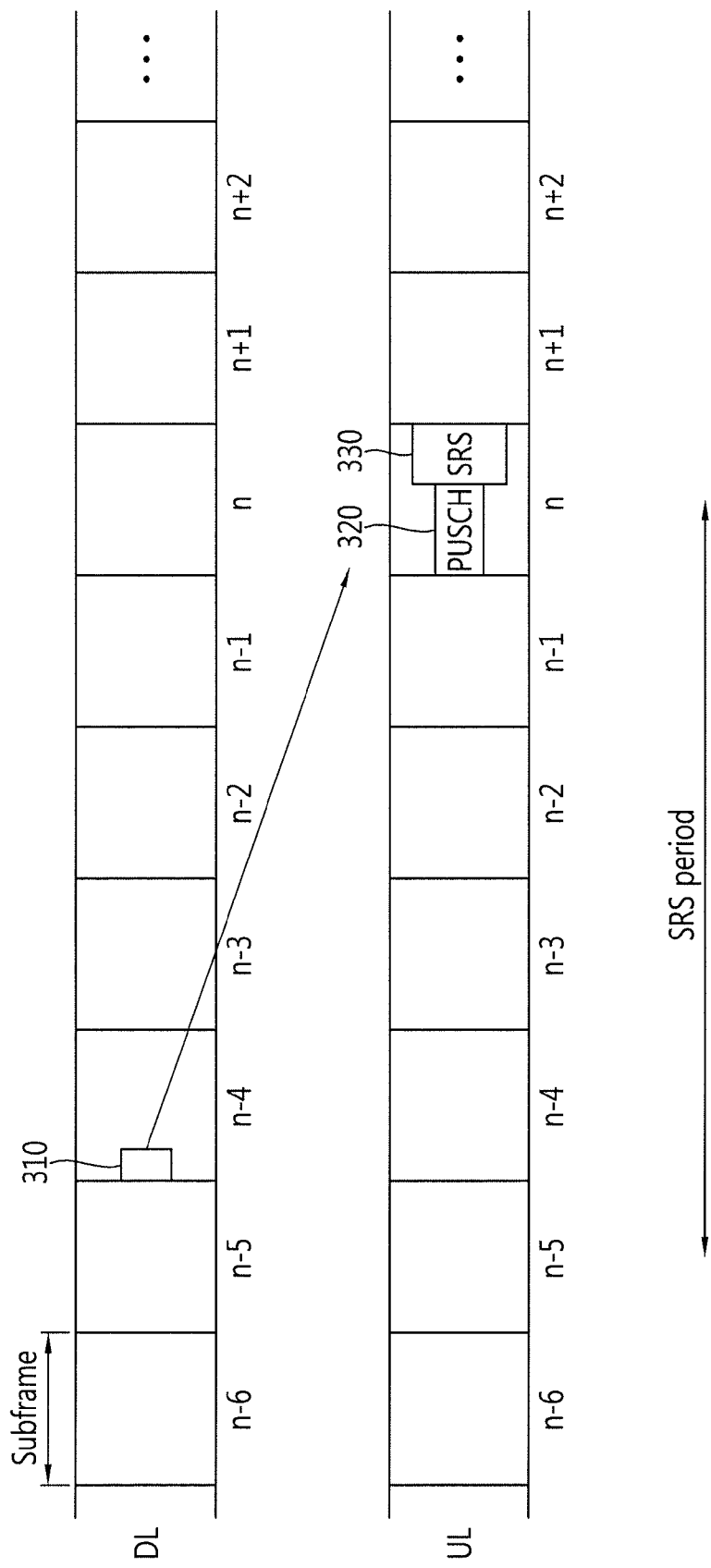
FIG. 6 shows an example of simultaneous transmission of a physical uplink shared channel (PUSCH) and a sounding reference signal (SRS).

FIG. 6 shows an example of simultaneous transmission of a PUSCH and an SRS.

In a DL subframe n-4, a wireless device receives a UL grant 310. Accordingly, a PUSCH 320 is transmitted in a UL subframe n.

In addition, SRS transmission is triggered in the UL subframe n. For example, an SRS period is 6 subframes, and the UL subframe n corresponds to an SRS subframe.

If it is configured such that the PUSCH 320 and the SRS 330 are transmitted in one subframe, the PUSCH 320 is not transmitted in an OFDM symbol in which the SRS 330 is transmitted. Therefore, the PUSCH 320 and the SRS 330 are prevented from being transmitted simultaneously in one OFDM symbol.

Meanwhile, even if a complexity of the wireless device is increased, it may be advantageous to support simultaneous transmission of a plurality of UL channels such as the SRS and the PUSCH in terms of network scheduling efficiency or radio resource utilization. Moreover, with the advancement of radio frequency (RF)/analog implementation techniques, simultaneous transmission of the plurality of channels may be more facilitated in terms of techniques and costs. Especially, the transmission of UL channels can be facilitated by implementing independently RF/analog modules for serving cells that are configured to one wireless device.

Accordingly, in an advanced version of 3GPP LTE, simultaneous transmission of the SRS and the PUSCH for different serving cells in one OFDM symbol can be allowed even if a plurality of serving cells are configured.

Figure 7:
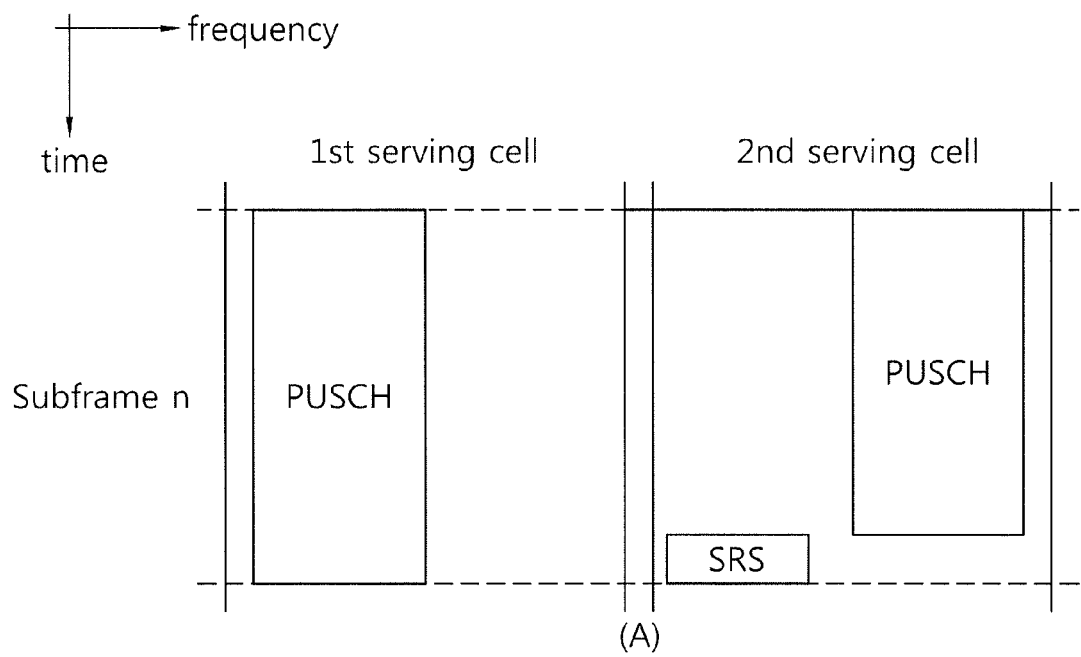
FIG. 7, including view (A) and view (B), shows an example of simultaneous transmission of an SRS and a PUSCH when a plurality of serving cells are configured.
Figure 7:
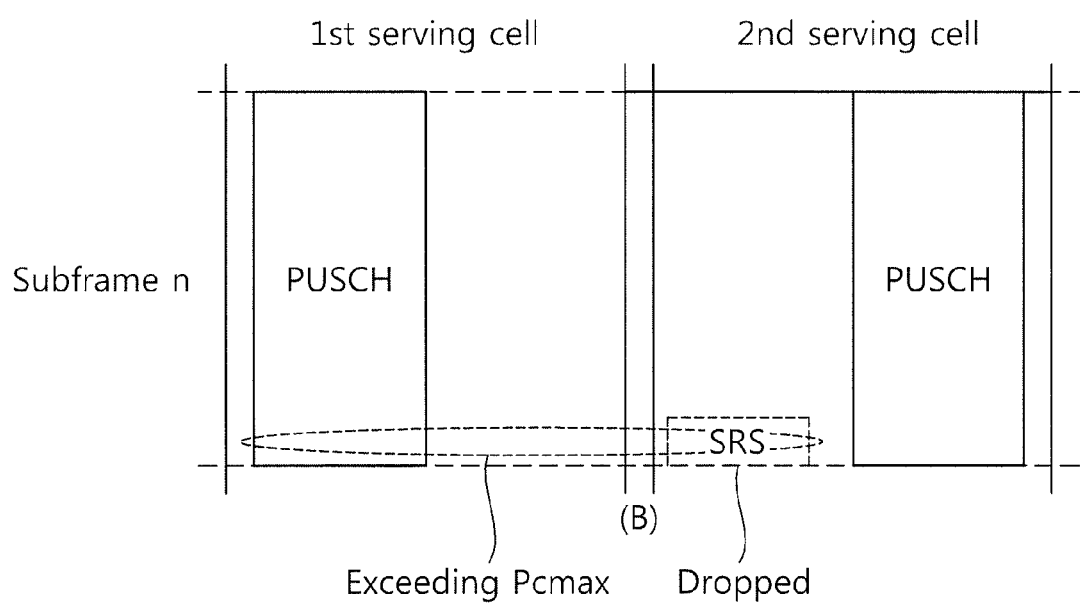

FIG. 7, including view (A) and view (B), shows an example of simultaneous transmission of an SRS and a PUSCH when a plurality of serving cells are configured.

In FIG. 7(A), a wireless device transmits the PUSCH in a subframe n of a $1^{st}$ serving cell, and transmits the PUSCH and the SRS in a subframe n of a $2^{nd}$ serving cell. In this case, the SRS is transmitted in a last OFDM symbol of the $2^{nd}$ serving cell, and the PUSCH is transmitted in the remaining OFDM symbols. Therefore, PUSCH transmission of the $1^{st}$ serving cell and SRS transmission of the $2^{nd}$ serving cell overlap in the last OFDM symbol (this is called an SRS symbol) of the subframe n.

When a sum of a transmit power of the PUSCH and a transmit power of the SRS in the SRS symbol exceeds a maximum transmit power (denoted by Pcmax), how to handle this situation is problematic. According to the proposed embodiment, SRS transmission may be dropped. This is shown in FIG. 7(B)).

When the SRS transmission is dropped, the $2^{nd}$ serving cell may transmit the PUSCH until a last OFDM symbol of the subframe n.

The problem lies in that a UL transmit power of the wireless device cannot be correctly recognized by a BS on a real-time basis. Whether a transmit power sum of a plurality of UL signals exceeds a maximum transmit power cannot be correctly known to the BS. Therefore, according to the example of FIG. 7, it is difficult for the BS to determine whether the SRS in the last OFDM symbol of the subframe will be transmitted by the wireless device in the $2^{nd}$ serving cell or whether the PUSCH will be transmitted due to a transmit power shortage. This may cause a problem in PUSCH decoding.

According to the proposed embodiment, in the SRS subframe in which the SRS and the PUSCH are simultaneously triggered, regarding the SRS symbol, the PUSCH is not transmitted regardless of whether the SRS is actually transmitted. This may be configured only for a specific serving cell or may be configured for all cells configured to the wireless device. The above configuration may be applied to a wireless device in which two or more serving cells are configured and/or a plurality of TA groups are configured.

Regardless of whether a frequency band at which the PUSCH is transmitted overlaps with a frequency band at which the SRS can be transmitted, the PUSCH may not be transmitted in the SRS symbol.

Figure 8:
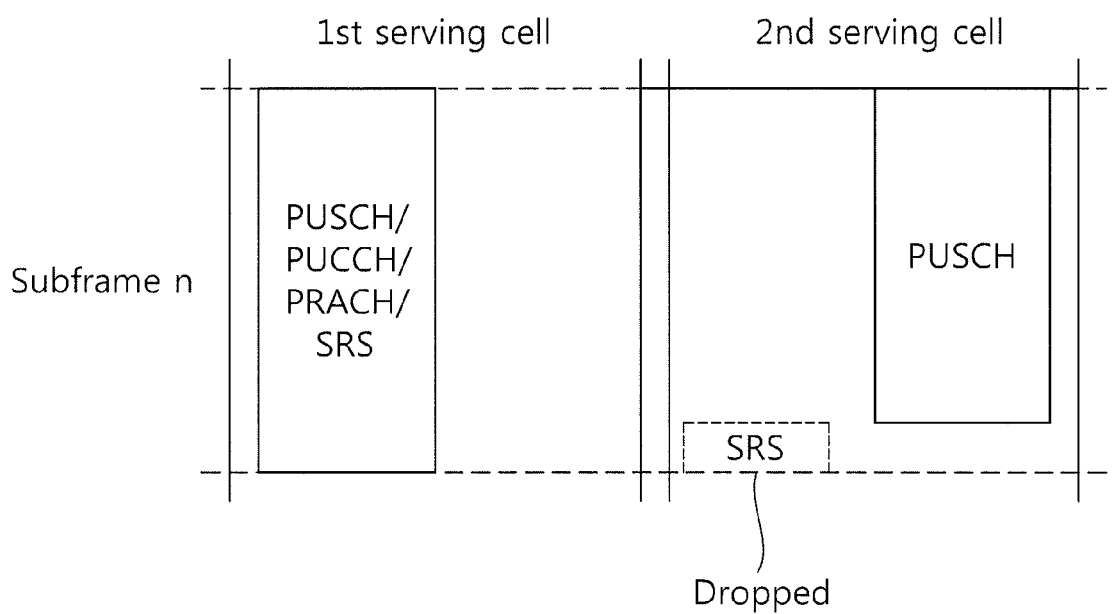
FIG. 8 shows UL transmission according to an embodiment of the present invention.

FIG. 8 shows UL transmission according to an embodiment of the present invention.

In a subframe n of a $2^{nd}$ serving cell, SRS transmission is triggered. If transmission of a UL channel in a subframe n of a $1^{st}$ serving cell overlaps with SRS transmission in the subframe n of the $2^{nd}$ serving cell, and if a total transmit power in the overlapped portion exceeds a maximum transmit power, a wireless device may drop SRS transmission in the $2^{nd}$ serving cell. The UL channel of the $1^{st}$ serving cell may include at least any one of an SRS, a PUCCH, a PUSCH, and a PRACH. The PUSCH of the $2^{nd}$ serving cell is not transmitted on a corresponding SRS symbol regardless of whether SRS transmission is dropped.

Since SRS transmission of a specific serving cell overlaps with UL transmission of another serving cell, regardless of whether the SRS transmission of the specific serving cell is dropped, PUSCH transmission of the specific serving cell is not performed in the SRS symbol. For example, if a subframe includes 14 OFDM symbols and a last OFDM symbol is an SRS symbol, the PUSCH is transmitted in 13 OFDM symbols, and is not transmitted in the last OFDM symbol.

Puncturing or rate matching may be performed so that the PUSCH is not transmitted in the SRS symbol. The puncturing is for determining the number of PUSCH bits by considering up to the SRS symbol, and the rate matching is for determining the number of PUSCH bits excluding the SRS symbol. For example, if the subframe includes 14 OFDM symbols, the puncturing may be for determining the number of PUSCH bits by considering all of the 14 OFDM symbols and the rate matching may be for determining the number of PUSCH bits by considering 13 OFDM symbol excluding the SRS symbol.

For example, when using the rate matching, the number Q of modulation symbols for the PUSCH may be determined as follows.

$$Q = \min\left\{\left\lceil \frac{O \cdot M_{sc,i} \cdot N_{symb,i} \cdot \beta_{offset}}{\sum_{r=0}^{C-1} K_r} \right\rceil, 4M_{sc}\right\} \quad \text{[Equation 4]}$$

Herein, O denotes the number of bits of a control signal (i.e., HARQ ACK/NACK or a rank indicator (RI)) transmitted in a corresponding PUSCH, and $N_{symb,i}=2(N_{sym}-1)-N_{SRS}$. $N_{sym}$ denotes the number of OFDM symbols in one slot. $N_{SRS}$ is 1 if a subframe for initial transmission is an SRS subframe, and otherwise 0. $\beta_{offset}$ denotes an offset value, and Msc denotes the number of subcarriers allocated to the PUSCH in a current subframe. Msc,i denotes the number of subcarriers allocated to initial transmission, C denotes the total number of code blocks, and Kr denotes the number of bits for a code block r.

That is, $N_{SRS}$ is always 1 regardless of whether SRS transmission is dropped in an SRS subframe. Regarding a wireless device in which a plurality of TA groups or a plurality of serving cells are configured, $N_{SRS}$ is 1 in the SRS subframe.

The SRS subframe may include a subframe in which SRS transmission is allowed according to a periodic SRS configuration and/or a subframe in which in which SRS transmission is allowed according to an aperiodic SRS configuration. The periodic SRS configuration and the aperiodic SRS configuration may be cell-specific or UE-specific.

Figure 9:
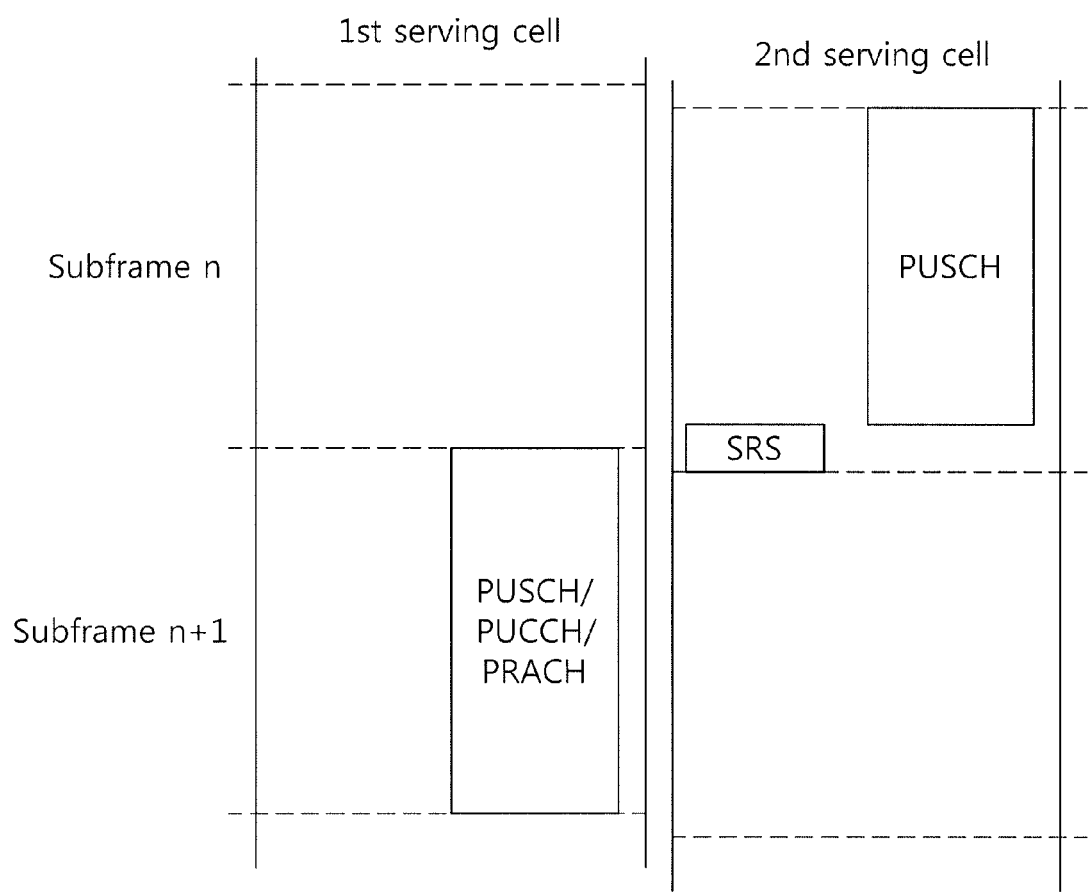
FIG. 9 and FIG. 10 are embodiments for serving cells each having a different TA value.
Figure 10:
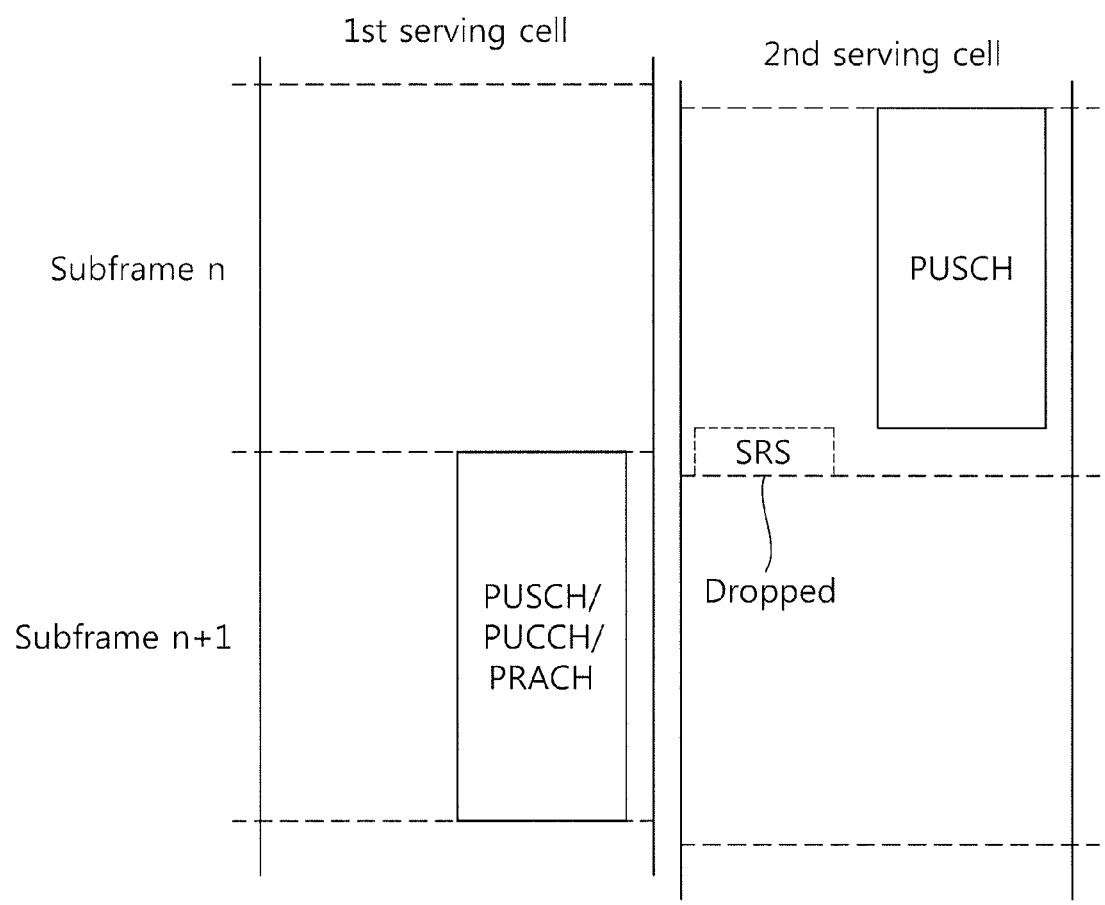

FIG. 9 and FIG. 10 are embodiments for serving cells each having a different TA value.

A 1st serving cell and a 2nd serving cell belong to different TA groups. A subframe n+1 of the 1st serving cell partially overlaps with a subframe n of the 2nd serving cell.

SRS transmission is triggered in the subframe n of the 2nd serving cell. Transmission of a UL channel in the subframe n+1 of the 1st serving cell overlaps with SRS transmission in the subframe n of the 2nd serving cell. The UL channel of the 1st serving cell may include at least any one of an SRS, a PUCCH, a PUSCH, and a PRACH.

The example of FIG. 9 shows that the wireless device performs SRS transmission in the 2nd serving cell if a total transmit power does not exceed a maximum transmit power in the overlapped portion.

In the example of FIG. 10, if the total transmit power exceeds the maximum transmit power in the overlapped portion, the wireless device drops SRS transmission in the 2nd serving cell.

The PUSCH of the 2nd serving cell is not transmitted in a corresponding SRS symbol regardless of whether the SRS transmission is dropped.

Since a BS can know that the PUSCH is not always transmitted in the SRS symbol of the SRS subframe, an error of a PUSCH decoding operation between the BS and the wireless device can be decreased.

Figure 11:
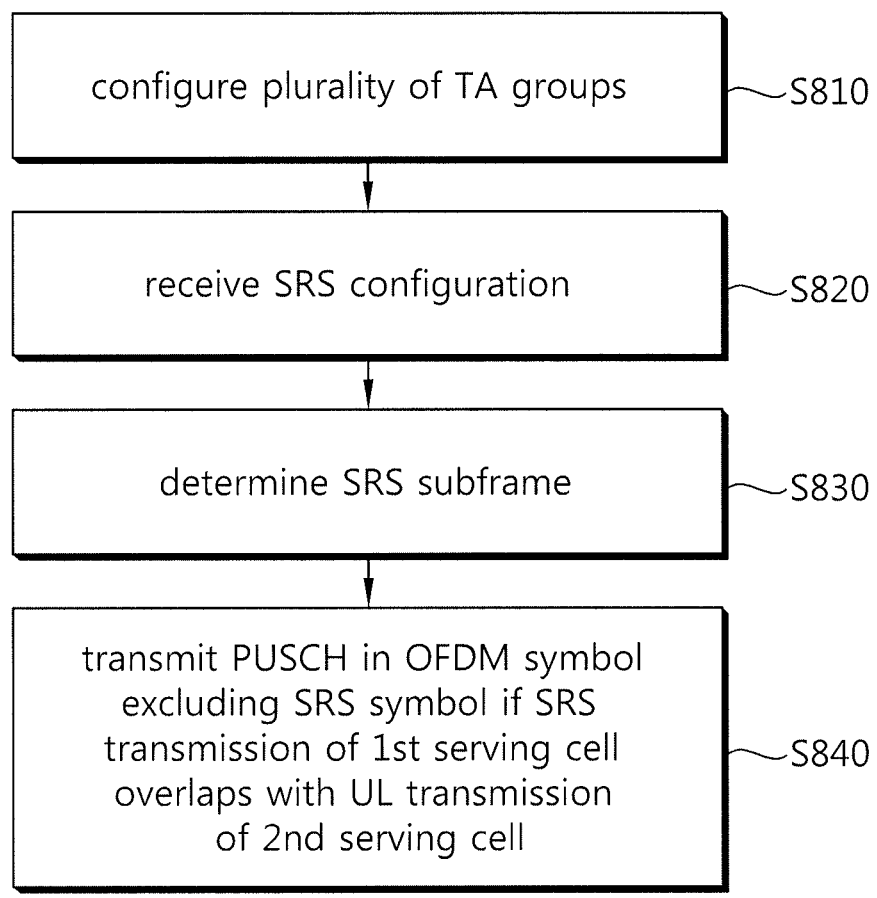
FIG. 11 is a flowchart showing UL transmission according to an embodiment of the present invention.

FIG. 11 is a flowchart showing UL transmission according to an embodiment of the present invention.

In step S810, a plurality of TA groups are configured in a wireless device. A timing advance command (TAC) is given independently for each TA group, and the TAC is applied independently. The same TAC is applied to serving cells belonging to the TA group. The configuration for the TA group may be transmitted from a BS through an RRC message, a MAC message, etc.

In step S820, the wireless device receives an SRS configuration for a 1st serving cell from the BS. The SRS configuration may be transmitted from the BS through the RRC message, the MAC message, etc. The SRS configuration may include a configuration for periodic SRS transmission or a configuration for aperiodic SRS transmission. The configuration for periodic SRS transmission may include an SRS period and/or an SRS offset.

In step S830, the wireless device determines an SRS subframe for SRS transmission on the basis of the SRS configuration. In this case, in the SRS subframe of the 1st serving cell, not only SRS transmission but also PUSCH transmission may be triggered.

In step S840, it is determined whether SRS transmission of the 1st serving cell overlaps with UL transmission of the 2nd serving cell. In case of the overlapping, a PUSCH of the 1st serving cell is transmitted in the remaining OFDM symbols other than the SRS symbol regardless of whether SRS transmission for the 1st serving cell is to be transmitted. As described in the embodiments of FIG. 8 to FIG. 10, the PUSCH for the 1st serving cell may be transmitted in the remaining OFDM symbols through rate matching or puncturing.

According to whether a UL transmit power of the wireless device exceeds a maximum transmit power in an overlapped portion, whether the SRS will be transmitted in the SRS symbol may be determined. The overlapped portion may include the entirety or part of the SRS symbol. If the UL transmit power of the wireless device exceeds the maximum transmit power, SRS transmission may be dropped. If the UL transmit power of the wireless device does not exceed the maximum transmit power, the SRS transmission may be performed.

Figure 12:
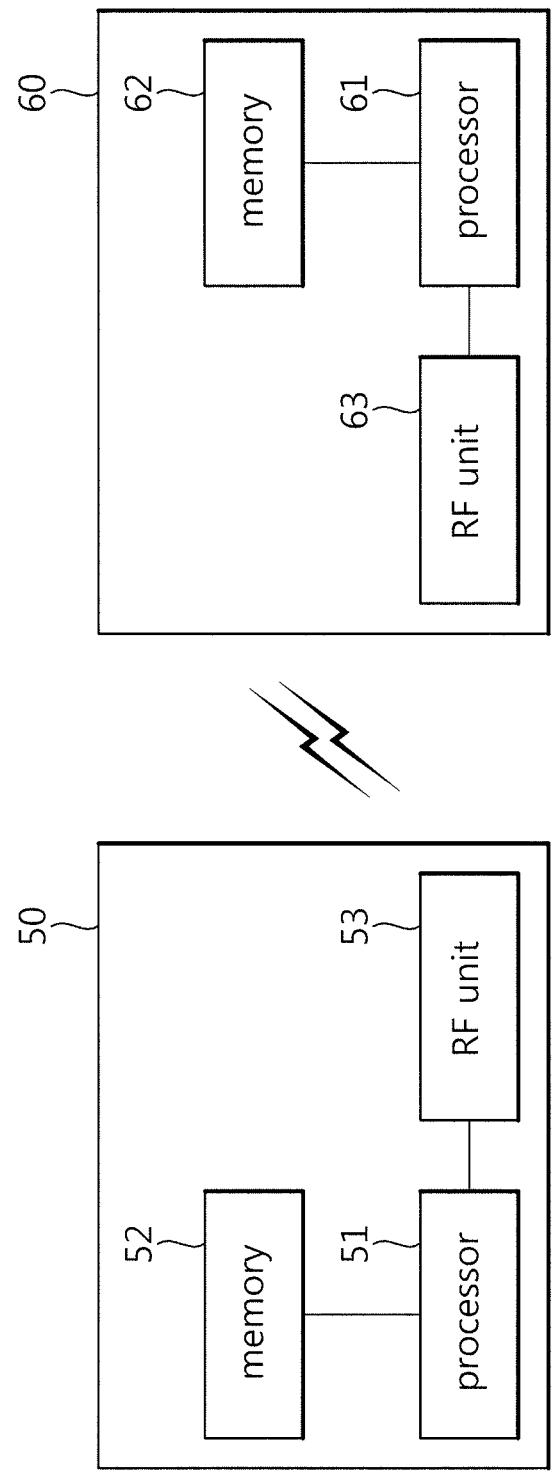
FIG. 12 is a block diagram showing a wireless communication system according to an embodiment of the present invention.

FIG. 12 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiments, the serving cell and/or the TA group may be controlled/managed by the BS, and an operation of one or more cells may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiments of FIG. 8 to FIG. 11, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting an uplink signal in a wireless communication system, the method comprising:
    setting up, by a user equipment (UE), a sounding reference signal (SRS) configuration for a first serving cell, the SRS configuration including information for an SRS transmission;
    determining, by the UE, an SRS subframe in which an SRS and a physical uplink shared channel (PUSCH) for the first serving cell are simultaneously triggered among a plurality of subframes according to the SRS configuration, the SRS subframe including a plurality of orthogonal frequency division multiplexing (OFDM) symbols;
    if an SRS transmission on the SRS subframe for the first serving cell is overlapped with an uplink transmission for a second serving cell, determining, by the UE, whether the SRS is actually to be transmitted in the SRS subframe based on a total uplink transmission power; and
    if the SRS is triggered by the SRS configuration and a plurality of timing advance groups are configured to the UE, transmitting, by the UE, the PUSCH on the SRS subframe for the first serving cell,
    wherein the PUSCH is transmitted on remaining OFDM symbols in the SRS subframe except a single OFDM symbol reserved for the SRS transmission regardless of whether the SRS is actually transmitted by the UE in the SRS subframe.

2. The method of claim 1, wherein if the total uplink transmission power exceeds the UE's maximum transmit power on the overlapped portion, the SRS transmission is dropped on the SRS subframe for the first serving cell.

3. The method of claim 2, wherein if the total uplink transmission power does not exceed the UE's maximum transmit power on the overlapped portion, the SRS is actually transmitted on the single OFDM symbol of the SRS subframe.

4. The method of claim 1, wherein the first serving cell and the second serving cell belong to different timing advance groups.

5. The method of claim 1, wherein the first serving cell and the second serving cell belong to same timing advance group.

6. The method of claim 1, wherein the single OFDM symbol reserved for the SRS transmission is a last OFDM symbol of the SRS subframe.

7. A device configured for transmitting an uplink signal in a wireless communication system, the device comprising:
    a radio frequency (RF) unit configured to receive and transmit radio signals; and
    a processor operatively coupled with the RF unit and configured to:
    set up, via the RF unit, a sounding reference signal (SRS) configuration for a first serving cell, the SRS configuration including information for an SRS transmission;
    determine an SRS subframe in which an SRS and a physical uplink shared channel (PUSCH) for the first serving cell are simultaneously triggered among a plurality of subframes according to the SRS configuration, the SRS subframe including a plurality of orthogonal frequency division multiplexing (OFDM) symbols;
    if an SRS transmission on the SRS subframe for the first serving cell is overlapped with an uplink transmission for a second serving cell, determine whether the SRS is actually to be transmitted in the SRS subframe based on a total uplink transmission power; and
    if the SRS is triggered by the SRS configuration and a plurality of timing advance groups are configured to the device, transmit, via the RF unit, the PUSCH on the SRS subframe for the first serving cell,
    wherein the PUSCH is transmitted on remaining OFDM symbols in the SRS subframe except a single OFDM symbol reserved for the SRS transmission regardless of whether the SRS is actually transmitted by the device in the SRS subframe.

8. The device of claim 7, wherein if the total uplink transmission power exceeds the device's maximum transmit power on the overlapped portion, the SRS transmission is dropped on the SRS subframe for the first serving cell.

9. The device of claim 8, wherein if the total uplink transmission power does not exceed the device's maximum transmit power on the overlapped portion, the SRS is actually transmitted on the single OFDM symbol of the SRS subframe.

10. The device of claim 7, wherein the first serving cell and the second serving cell belong to different timing advance groups.

11. The device of claim 7, wherein the first serving cell and the second serving cell belong to same timing advance group.

* * * * *